(12) United States Patent
Guillemin et al.

(10) Patent No.: US 11,113,384 B2
(45) Date of Patent: Sep. 7, 2021

(54) STACK OVERFLOW PROTECTION BY MONITORING ADDRESSES OF A STACK OF MULTI-BIT PROTECTION CODES

(71) Applicant: STMicroelectronics (Rousset) SAS, Rousset (FR)

(72) Inventors: Pierre Guillemin, Marseilles (FR); William Orlando, Peynier (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 499 days.

(21) Appl. No.: 15/847,827

(22) Filed: Dec. 19, 2017

(65) Prior Publication Data
US 2018/0181748 A1    Jun. 28, 2018

Related U.S. Application Data

(63) Continuation of application No. 13/543,673, filed on Jul. 6, 2012, now abandoned.

(30) Foreign Application Priority Data

Jul. 8, 2011    (FR) ..................... 11/56210

(51) Int. Cl.
*G06F 21/52*    (2013.01)
*G06F 9/00*    (2006.01)

(52) U.S. Cl.
CPC ............. *G06F 21/52* (2013.01); *G06F 9/00* (2013.01); *G06F 2221/2123* (2013.01); *G06F 2221/2153* (2013.01)

(58) Field of Classification Search
CPC ..................................... G06F 21/52
See application file for complete search history.

(56) References Cited

U.S. PATENT DOCUMENTS 6,035,380 A    3/2000 Shelton et al.
6,202,176 B1    3/2001 Baldischweiler et al.
(Continued)

FOREIGN PATENT DOCUMENTS

EP    1 708 071 A1    10/2006
EP    1708071 A1 * 10/2006    ............. G06F 21/52

OTHER PUBLICATIONS

Silberman et al, A comparison of buffer overflow prevention implementations and weaknesses, 2004, 29 pages, retrieved from the internet on Feb. 5, 2020, retrieved from URL <www.blackhat.com/presentations/bh-usa-04/bh-us-04-silberman/bh-us-04-silberman-paper.pdf> (Year: 2004).*

(Continued)

*Primary Examiner* — Jyoti Mehta
(74) *Attorney, Agent, or Firm* — Seed IP Law Group LLP

(57) ABSTRACT

A hardware monitor circuit includes an electronic control circuit coupled to a processing unit. The electronic control circuit generates multi-bit protection codes and directs operations of the hardware monitor circuit. A bus interface is coupled to an address bus of the processing unit, and the bus interface passes signals associated with a stack structure of the processing unit. The stack structure is arranged to store the multi-bit protection codes in an internal memory coupled to the processing unit. Comparators in the hardware monitor circuit are arranged to accept values from the internal memory and gating logic coupled to the comparators is arranged to generate an error signal when it detects that an address on the address bus read via the bus interface is equal to an address stored in the internal memory. Upon generating the error signal, the processing unit is placed in a secure mode.

18 Claims, 3 Drawing Sheets

(56) References Cited

U.S. PATENT DOCUMENTS

| | | | |
|---|---|---|---|
| 7,380,106 B1* | 5/2008 | Bilski | G06F 9/3004 712/225 |
| 7,380,245 B1 | 5/2008 | Lovette | |
| 7,581,089 B1 | 8/2009 | White | |
| 2001/0013094 A1 | 8/2001 | Etoh et al. | |
| 2002/0049983 A1* | 4/2002 | Bove, Jr. | H04N 1/64 725/135 |
| 2002/0184434 A1 | 12/2002 | Kawaura | |
| 2003/0046614 A1 | 3/2003 | Brokish | |
| 2003/0182572 A1 | 9/2003 | Cowan et al. | |
| 2003/0204745 A1 | 10/2003 | Abrams | |
| 2003/0217277 A1 | 11/2003 | Narayanan | |
| 2004/0148457 A1 | 7/2004 | Hakushi et al. | |
| 2004/0168078 A1 | 8/2004 | Brodley et al. | |
| 2005/0027958 A1 | 2/2005 | Fuente et al. | |
| 2005/0144471 A1 | 6/2005 | Shupak et al. | |
| 2006/0161739 A1 | 7/2006 | Genty et al. | |
| 2007/0089088 A1 | 4/2007 | Borde et al. | |
| 2007/0174622 A1 | 7/2007 | Romain et al. | |
| 2008/0133858 A1 | 6/2008 | Enbody et al. | |
| 2008/0140884 A1 | 6/2008 | Enbody et al. | |
| 2009/0144309 A1 | 6/2009 | Cabrera Escandell et al. | |
| 2010/0017660 A1 | 1/2010 | Tilton et al. | |
| 2010/0088705 A1 | 4/2010 | Attinella et al. | |

OTHER PUBLICATIONS

Tanenbaum, Structured Computer Organization, 1984, Prentice Hall, 2nd edition, 7 pages (Year: 1984).*

The Supervisor State, 1998, McGill University, 3 pages, [retrieved from the internet on Jan. 10, 2020], retrieved from URL < www.cs.mcgill.ca/~cs573/fall2002/notes/lec273/lecture21/21_1.htm> (Year: 1998).*

Chiamwongpaet et al., "The Implementation of Secure Canary Word for Buffer-Overflow Protection," *IEEE International Conference on Electro/Information Technology*, Windsor, ON, Canada, Jun. 7-9, 2009, pp. 56-61.

French Search Report, for corresponding French Application No. FR 1156210, dated Dec. 23, 2011, 6 pages.

Paxdiablo, "What is a stack pointer used for in microprocessors?" Sep. 23, 2009, URL=http://stackoverflow.com/questions/1464035/what-is-a-stack-pointer-used-for-in-microprocessors, download date Nov. 25, 2014, 4 pages.

Richarte, "Four different tricks to bypass StackShield and StackGuard protection," Apr. 9, 2002, Core Security Technologies, URL=https://www.cs.purdue.edu/homes/xyzhang/spring07/Papers/defeat-stackguard.pdf, download date Nov. 25, 2014, pp. 1-30.

Tanenbaum, *Structured Computer Organization*, $2^{nd}$ edition, Prentice-Hall, Englewood Cliffs, New Jersey, 1984, pp. 10-12. (5 pages).

Tanenbaum, *Structured Computer Organization*, $4^{th}$ edition, Prentice-Hall, Englewood Cliffs, New Jersey, 2000, pp. 451-452. (7 pages).

Tarnoff, "The Intel 8088 Architecture," URL=http//faculty.etsu.edu/tarnoff/ntes2150/uproc/arch8088.htm, download date Nov. 17, 2014, 8 pages.

Wagle et al., "StackGuard: Simple Stack Smash Protection for GCC," *GCC Developers Summit*, URL=ftp://gcc.gnu.org/pub/gcc/summit/2003/Stackguard.pdf, download date Nov. 25, 2014, pp. 243-256.

* cited by examiner

STACK OVERFLOW PROTECTION BY MONITORING ADDRESSES OF A STACK OF MULTI-BIT PROTECTION CODES

CROSS-REFERENCE TO RELATED APPLICATIONS

This application is a continuation of U.S. patent application Ser. No. 13/543,673, filed Jul. 6, 2012, which claims the priority of FR 1156210, filed Jul. 8, 2011, which are hereby incorporated by reference in their entirety.

BACKGROUND

Technical Field

The present disclosure relates to the protection of a microprocessor against stack overflow. The call stack of a microprocessor is a volatile memory zone directed to the storage of data concerning functions executed by the microprocessor. In particular, the stack allows the storage of an address to which the microprocessor should return after having executed a function.

Description of the Related Art

When a first function or "call function" calls a second function or "called function", the call function places its return address in the stack. When the called function has finished the task for which it was designed, it fetches the return address from the stack. When the functions call each other, return addresses accumulate in the stack and are fetched one after the other after the execution of a function. Besides return addresses, the stack receives data associated with call or called functions, such as local variables of the called function, parameters of the called function, a frame pointer of the call function, etc.

When too much information is stored in the stack, a phenomena called stack overflow occurs, which may be an external overflow or an internal overflow. External overflow is an overflow beyond the amount of memory space attributed to the stack, whereas internal overflow is when writing of a data zone overflows into another data zone, in particular into a zone containing a return address. Such an internal overflow may be caused intentionally by an attacker aiming to take control of the microprocessor, and the return address pointing to the call function may be replaced by a return address pointing to a malicious program. In the present application, the term "stack overflow" designates an internal overflow.

A known method of countering stack overflow attacks consists of inserting a protection code, also known as a "canary", in the stack. Such codes are generally small whole numbers of random value placed at strategic locations in the stack, preferably before each return address. To detect that the stack has not been subjected to a fraudulent overflow, the value of the canary is checked to determine that it has not been changed before the called function uses the return address present in the stack.

This technique considerably increases the difficulty of exploiting stack overflow, since it relates to the attacker taking control of the instruction pointer by complex means.

Nevertheless, this technique is not infallible because it entirely depends on the provision of canary insertion and verification instructions in the program executed by the microprocessor. An attack on the program itself may therefore allow a subsequent attack on the stack by neutralizing the canary verification instructions.

Similarly, an attacker may provoke a stack overflow that is undetected by reading the canary and then re-writing the correct value of the canary in the initial space while modifying the return address.

It may therefore be desired to reinforce the security offered by the insertion of canaries in the call stack of a microprocessor.

BRIEF SUMMARY

Embodiments of the invention relate to a microprocessor having a central processing unit, at least one call stack, a stack pointer, an address bus, a data bus, and a hardware monitor configured to: generate protection codes, insert protection codes in the stack or let the central processing unit insert them, store addresses of protection codes inserted in the stack, and generate an error signal in response to an attempt to modify a protection code present in the stack.

According to one embodiment, the monitor is also configured to generate the error signal in the case of an attempt to read a protection code in the stack.

According to one embodiment, the monitor is configured to generate random or pseudo-random protection codes.

According to one embodiment, the monitor is configured to generate deterministic and reproducible protection codes.

According to one embodiment, the monitor is configured to monitor the address bus, and generate the error signal if an address of a stored protection code appears on the address bus.

According to one embodiment, the monitor includes a first register write-accessible to the central processing unit, and is configured to generate a protection code and apply the value of the protection code on the data bus in response to the write of a data in the register by the central processing unit.

According to one embodiment, the monitor is also configured to insert the protection code in the stack, at an address present in the first register.

According to one embodiment, in response to a protection code erase request by the central processing unit or by the program executed by the central processing unit, the monitor is configured to read the protection code in the stack at an address specified by the erase request, compare the protection code with an expected protection code value, and generate the error signal if the read value is different from the expected value.

According to one embodiment, the monitor itself is configured to erase the protection code in the stack after having verified the protection code.

According to one embodiment, the monitor includes a second register write-accessible to the central processing unit, and is configured to interpret a write of the second register as a request to erase a protection code.

According to one embodiment, the monitor is configured to interpret a write of the second register as an erase request of a protection code at an address present in the second register.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements and have been solely selected for ease of recognition in the drawings. One or more embodiments are described hereinafter with reference to the accompanying drawings in which.

DETAILED DESCRIPTION

Figure 1:
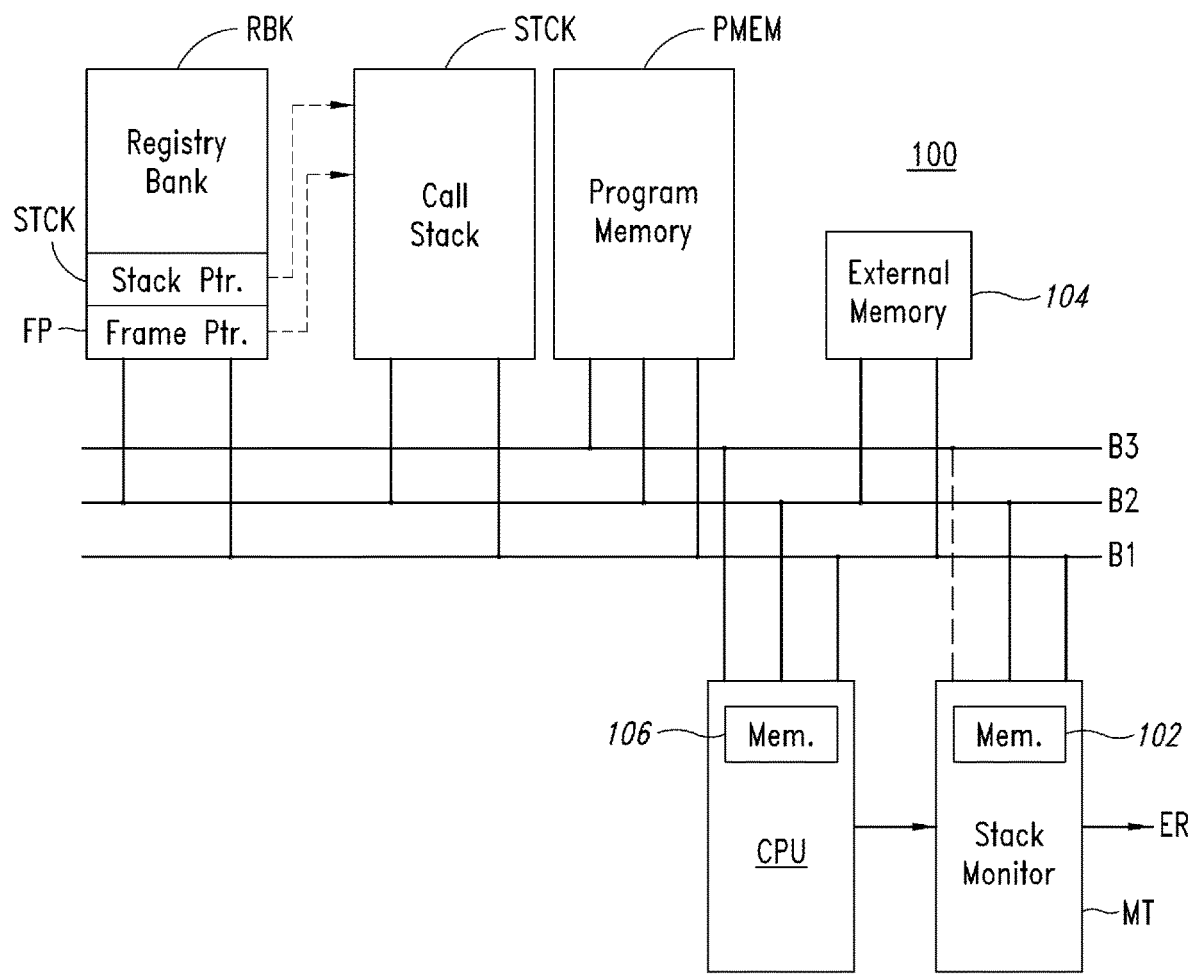
FIG. 1 shows a microprocessor comprising a stack monitor according to one embodiment.

FIG. 1 shows a microprocessor 100 according to one embodiment. The microprocessor 100 includes a central processing unit CPU, hereinafter "the CPU", a program memory PMEM, a call stack STCK, and a registry bank RBK. These different elements are linked by an address bus B1, a data bus B2, and an instruction bus B3.

Registry bank RBK includes a stack pointer register SP and a frame pointer register FP. The stack pointer contains the address of the top of the stack STCK and the frame pointer contains the start address of a frame of a function being executed. Program memory PMEM contains a program executed by the CPU.

It will be noted that instruction bus B3 is an optional microprocessor element, its provision particular to the architecture used, here the Harvard architecture. A Von Neumann architecture only includes bus B2 to convey both the data and the instructions.

The microprocessor 100 also includes a stack monitor MT according to one embodiment. Monitor MT is configured to place protection codes or "canaries" in the stack STCK as it is being filled by the CPU. The monitor is also configured to detect attempts to write the stack at the canary addresses, e.g., attempts to alter the canaries, and preferably to also detect attempts to read the canaries.

In one embodiment, the monitor only monitors address bus B1 and launches an alert when the address of a canary appears on address bus B1. In this case, the monitor does not try to determine whether it is a read or write attempt, and does not monitor instruction bus B3 (or bus B2 in a Von Neumann architecture). The alert is unconditional and is for example emitted in the form of an error signal ER.

Signal ER is applied to an interruption decoder that sets the CPU in a secure error processing sub-program (for example a secure interrupt of the platform termed "trust zone", the processing of which is done in secure mode in protected memories). Alternatively, signal ER is used to provoke a CPU reset.

During the return to a call function, monitor MT also operates such that the canary surveillance is lifted before the canary is erased. Before lifting the surveillance, the monitor verifies that the canary value has not been altered. To this end, the monitor reads the canary and compares it with an initial value saved in its internal memory 102. In one embodiment, the monitor itself performs the erasure of the canary in the stack. In another embodiment, this erasure is assured by the CPU.

Thus, monitor MT is a hardware means to generate and to monitor the canaries, and cannot be corrupted by a fraudulent alteration of the program executed by the CPU. The monitor is a sort of impartial arbitrator, independent of the program itself, and confers a high level of security to the generation and the surveillance of canaries.

Figure 2:
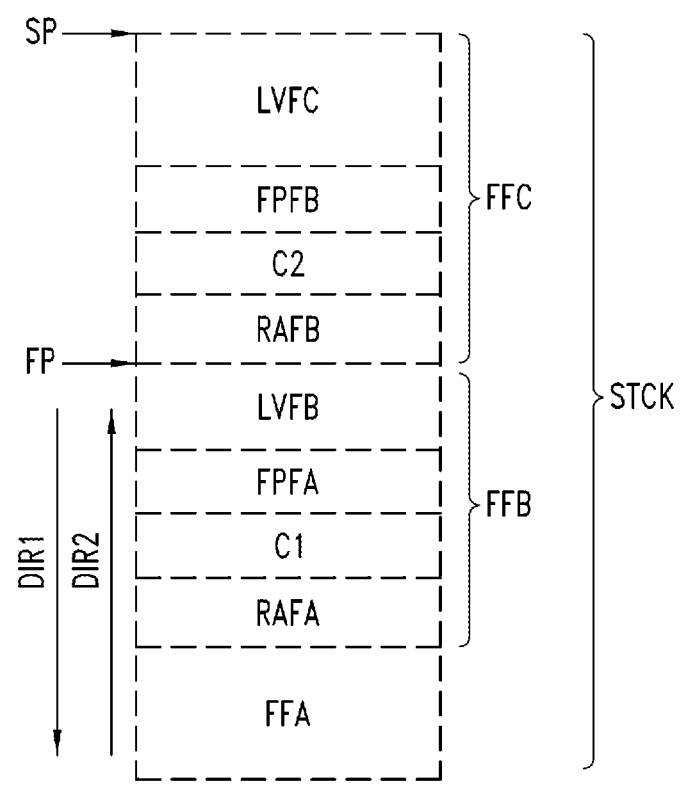
FIG. 2 shows an example of contents of the stack.

FIG. 2 shows an example of inserting canaries in stack STCK and an example of the stack contents. An arrow DIR1 indicates the increasing address direction and an arrow DIR2 indicates the stack filling direction. Here, the filling is done from the highest value address to the lowest value address. The "top" of the stack, corresponding to the current value of stack pointer SP, thus corresponds here to the lowest value of the stack. It will be noted that in other embodiments, the stack can have a reversed filling direction, corresponding to the increasing address direction.

In the example shown, the stack includes frame FFA of a function FA, frame FFB of a function FB, and frame FFC of a function FC being executed. It is assumed that function FC was called by function FB and that function FB was called by function FA. Each frame contains contextual data of the considered function and return data to the call function.

Thus, frame FFB of function FB includes a return address RAFA to function FA, a frame pointer value FPFA of function FA, and local variables LVFB of function FB. A canary C1 was inserted by monitor MT in frame FFB, for example between return address RAFA and frame pointer value FPFA.

Frame FFC of function FC includes a return address RAFB of function FB, a frame pointer value FPFB of function FB, and local variables LVFC of function FC. A canary C2 was inserted by monitor MT in frame FFC, for example between return address RAFB and frame pointer value FPFB.

The current value of stack pointer SP designates the top of the stack (the lowest address), and the current value of the frame pointer designates the position of the return address RAFB to function FB.

Canaries C2 and C1 are monitored in real time by monitor MT. Thus, any attempt to overflow the stack in order to smash return address RAFB and/or return address RAFA implies a stack write attempt at the locations of canaries C2 and C1. This attempt is detected by monitor MT and leads it to emit error signal ER. Similarly, any attempt to read the canaries is preferably detected by the monitor, which also emits the error signal.

To use monitor MT, canary insertion and erasure instructions are provided in the program executed by the CPU (program stored in program memory PMEM).

The implementation of embodiments may be the object of diverse variations which will be evoked in the following, before a detailed example implementation of monitor MT is provided in relation with FIG. 3.

Modification of the Program to Use the Monitor

The use of monitor MT supposes instructions in the program executed by the CPU for the insertion and erasure of canaries.

By "canary erasure instruction" is meant an instruction that leads monitor MT to lift the surveillance of the canary targeted by the instruction, in preparation for its erasure by the CPU, or which leads the monitor to lift the surveillance and to erase the canary from the stack itself.

To this end, several options may be provided:
  an explicit modification of the program by the programmer (calling macros or dedicated functions),
  a modification of the program by the compiler so that this operation is transparent to the programmer,
  a post-compilation of the generated binary code, also to render the operation transparent to the programmer, the modification of the compiler so that the programmer can indicate, by means of a "preprocessing" command (for example a command of the "pragma" type as specified by the C language standard), how the compiler should operate to compile a program section or a function. This allows the compiler to add the canary insertion and erasure instructions, while leaving to the programmer the choice as to which program sections or functions should be protected.

Generation of Canaries

The value of a canary may be:

supplied by a random or pseudo-random generator, or deterministic and reproducible: the value of the canary is for example determined by the monitor as a function of known variables such as the address at which the canary is placed, and of a secret or random value known only to the monitor, or even a call function identifier supplied by the compiler.

The value of the canary preferably includes a byte at 0 to offer protection against faults due to character chain manipulations.

Insertion of Canaries in the Stack

The canaries are placed between the local variable zones and the return addresses in the embodiment. Indeed, it is preferable that they are situated between the zones sensitive to overflow and the zones to protect from an overflow. In one embodiment, additional canaries are placed at other locations in the stack to obtain the equivalent of a "mine field" offering application perspectives extending beyond the simple protection of return addresses.

The insertion of a canary in the stack may be launched by the monitor:

automatically upon detection of a "call" type instruction causing a change of context in the stack. In this case, the monitor is linked to instruction bus B3, as shown in dotted lines in FIG. 1, and includes means of decoding such an instruction (in the Von Neumann architecture, this monitoring is done on bus B2);

upon an explicit request by the program. An explicit request may consist of a specific canary insertion instruction that the monitor decodes, or more simply a write instruction of a monitor register, interpreted by the monitor as an insertion instruction.

Management of Canary Addresses

In order to monitor the different canaries placed in the stack, the monitor keeps track of where they are. To this end, the canary addresses are stored in an internal memory 102 of the monitor or an external memory 104 accessible by the intermediary of the data and address buses. Alternatively, a low-capacity internal memory 106 (memory zone within the CPU) may be provided to store the addresses of the canaries most recently introduced into the stack, and a complementary memory 104 may be provided to store the addresses of other canaries. A distinction is therefore made between "active" canaries, the addresses of which are under surveillance because they are loaded in the internal memory 102 of the monitor, and "inactive" canaries, the addresses of which are not monitored. During a change of context, the addresses of canaries present in the external memory 104 are transferred to the internal memory 102 to be monitored by the monitor. The canaries whose addresses were transferred thus become "active".

The addresses stored in an external memory 104 are preferably protected in confidentiality and integrity, for example by encryption and association with an error correction code.

Similarly, the values of the canaries, if they are not deterministic and reproducible, may be stored in an internal memory 102 of the monitor or in the memory 106 of the CPU, in a form protected by confidentiality and integrity.

Monitoring of Canary Addresses

The monitor should first detect and prevent an attempt to write the stack at the canary addresses. The write attempt may be a modification attempt by the CPU or by a host device that can access the data bus and the address bus.

Preferably, the monitor also detects and prevents attempts to read the stack at a canary address. Indeed, certain attacks take advantage of a prior knowledge of the canary values.

To this end, the monitor compares the current address present on the address bus to the addresses of "active" canaries.

This monitoring may concern the addresses of all the canaries inserted in the stack (exhaustive monitoring) or only the addresses of the canaries associated with the current task, the function being executed. In the second case, the monitor is informed of a task change so that it can update the canary addresses to monitor.

The surveillance of the current address is done for example by comparators, each receiving the current address on one input and an address of a canary to monitor on another input. The detection time is preferably constant and short. The number of canaries simultaneously monitored may be limited to the number of comparators included in the monitor. A multiple-value comparator may also be provided to successively compare the current address with each canary address.

If the surveillance only concerns the canaries of the current task, the monitor recharges its internal comparators during a context change by applying the canary addresses associated with the new task to the comparators.

The new addresses applied to the comparators are imported from an external memory after integrity verification and error correction, or are selected in an internal memory zone associated with the considered task.

Erasure of a Canary

The erasure of a canary includes a prior step of verifying the value of the canary by comparison with an expected value by the monitor.

To this end, the monitor reads the canary in the stack and compares it with an expected value. If the value of the canary is not the same as the expected value, the monitor emits error signal ER.

The erasure of a canary may be launched upon detection of a "return" type instruction on instruction bus B3 (or on bus B2 in a Von Neumann architecture), or by the intermediary of an explicit request, indicating the address of the canary to erase, present in the program, or even by the intermediary of an access to a monitor register.

Figure 3:
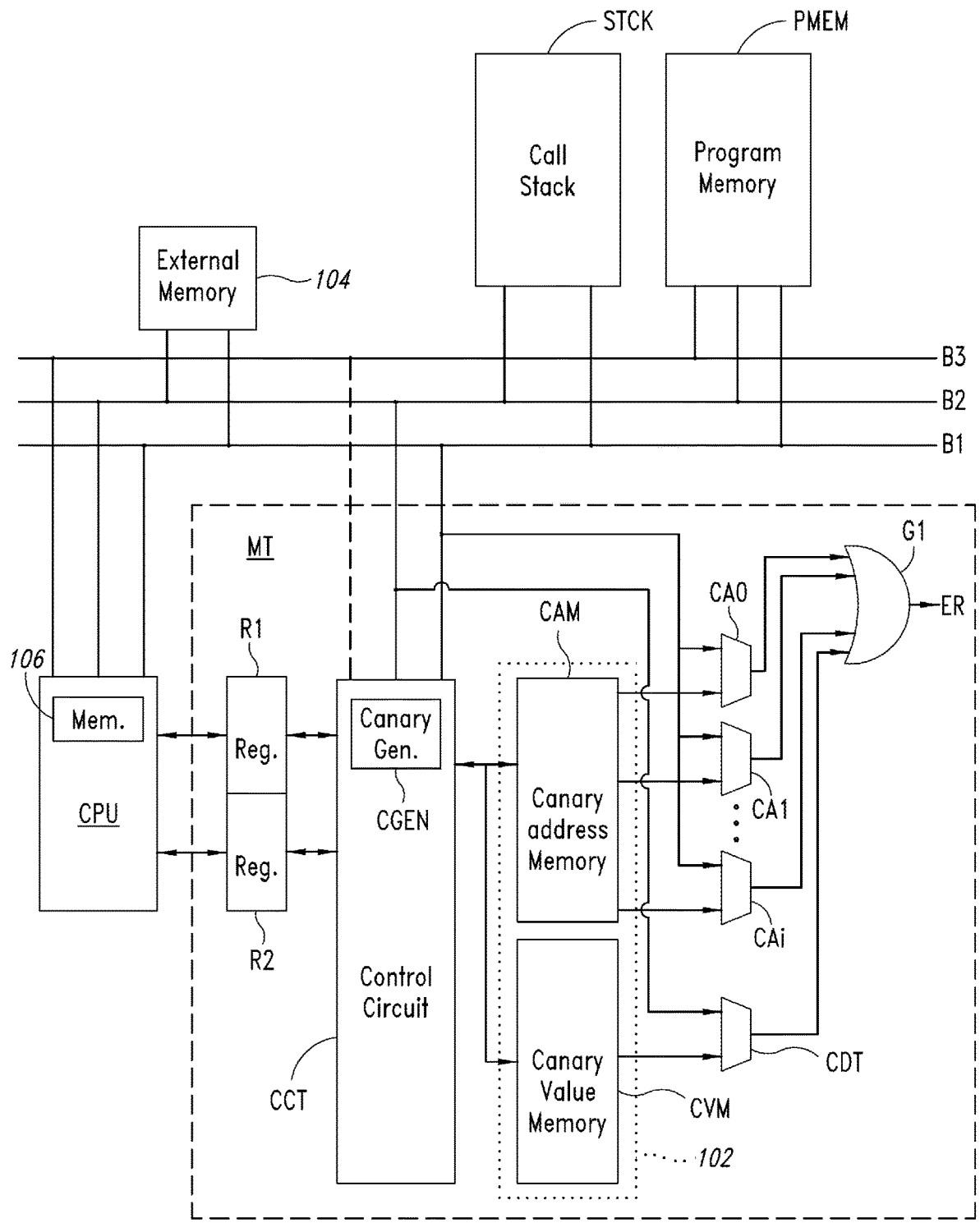
FIG. 3 shows an implementation example of the stack monitor.

FIG. 3 shows an implementation example of monitor MT according to the guidelines presented above.

Monitor MT includes a control circuit CCT linked to address bus B1 and to data bus B2 of the CPU, a volatile memory CAM, a volatile memory CVM, address comparators CA0, CA1, . . . CAi, and a canary comparator CDT. Control circuit CCT is a hard-wired circuit of the state machine type. It is equipped with a random or pseudo-random generator CGEN, and two registers R1, R2 write-accessible to the CPU. Memory CAM is provided to store canary addresses, whereas memory CVM is provided to store canary values. The outputs of comparators CA0-CAi, CDTn are sent to an OR type gate G1, the output of which supplies error signal ER.

Memory CAM has a look up table structure and includes N parallel outputs supplying, in read mode, i+1 canary addresses associated with an index applied at the input of the memory. Each canary address supplied by memory CAM is applied on an input of a comparator CA0-CAi, the other input of which is linked to address bus B1.

Memory CVM also has a look up table structure and includes an output supplying, in read mode, a canary value associated with an address value supplied at the input of the memory. This value is applied to an input of comparator CDT, the other input of which is linked to data bus B2.

Register R1 receives an insertion address of a canary supplied by the CPU, and optionally a call function identifier, a called function identifier, or both.

Control circuit CCT is configured to detect a write of register R1 and to interpret this write as a request to write a canary in stack STCK, at the address present in the register.

Thus, to write a canary, the programmer or the compiler simply inserts a write instruction of register R1 in the program. This embodiment can be adapted to any type of microprocessor without having to provide a specific canary insertion instruction.

In response to the write of register R1, control circuit CCT:
generates a canary, here by means of generator CGEN,
takes control of address bus B1 and of data bus B2 and
  writes the canary in stack STCK at the specified address,
stores the address of the canary in memory CAM in relation with an associated index which can be the identifier of the call or called function,
stores the value of the canary in memory CVM in relation with the address of the canary,
sets memory CAM in read mode and applies the index associated with the canary address to the memory.

Thus, the addresses of all the canaries associated with this index (for example all the canaries associated with the identifier of the call or called function) are applied to comparators CA0-CAi and are under surveillance. If the address of one of the canaries under surveillance appears on address bus B1, the output of one of comparators CA0-CAi goes to 1 and signal ER at the output of gate G1 goes to 1, launching the protection process of the system described herein (reset of the microprocessor or secure error processing).

In one variant, the write address of the canary is applied on the address bus by the CPU. Register R1 is used to communicate the identifier of the current process or any other information other than the address of the canary to control circuit CCT. Control circuit CCT reads this address on the address bus in order to store it in memory CVM, and supplies only the value of the canary on the data bus. The CPU itself then applies a write command to stack STCK.

In response to the write of an address in register R2, control circuit CCT:
applies the address present in register R2 on the bus and reads the value of the canary in the stack. This value is thus found on data bus B2 and on one input of comparator CDT,
sets memory CVM in read mode and applies the address present in register R2 as a read index to the memory. The initial value of the canary stored in relation with this address thus finds itself on a second input of comparator CDT.

If the two values are different, the output of comparator CDT goes to 1 and signal ER at the output of gate G1 goes to 1, launching the system protection process.

In absence of the error signal, control circuit CCT itself can perform the erasure of the canary in the stack by accessing it in write mode, then erasing the address of the canary in its internal memory. Alternatively, circuit CCT can let the CPU do this erasure, after having erased the address of the canary from its internal memory in order that it is no longer under surveillance.

In the case where circuit CCT is not configured to perform this erasure by itself, the programmer or the compiler should provide a stack erase instruction to the attention of the CPU after a write instruction of register R2.

In a variant evoked herein, control circuit CCT generates deterministic canary values and regenerates them in response to a write of register R2. In this case, memory CVM is not necessary.

Many other embodiments may be provided by the skilled person. In particular, in certain embodiments, the CPU is equipped with a cache memory, which may be formed for example as all or part of memory 106, arranged between the program memory and the CPU and receives instructions to execute several clock cycles before they are to be executed. In this case, the monitor is preferably arranged between the CPU and the cache, and is configured to observe the transactions performed by the CPU.

The various embodiments described above can be combined to provide further embodiments. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hardware monitor circuit, comprising:
an electronic control circuit configured to be coupled to a processing unit, the electronic control circuit being configured to generate multi-bit protection codes and to direct operations of the hardware monitor circuit;
a bus interface coupled to an address bus of the processing unit, the bus interface configured to pass signals associated with a stack structure of the processing unit, the electronic control circuit being configured to store the multi-bit protection codes in at least one internal memory of the electronic control circuit and to control insertion of the multi-bit protection codes into the stack structure of the processing unit;
a plurality of comparators arranged to accept values from the at least one internal memory; and
gating logic coupled to the plurality of comparators, the gating logic arranged to generate an error signal upon detection of an address on the address bus read via the bus interface being equal to an address stored in the at least one internal memory, wherein the error signal forces the processing unit into a secure mode, wherein in response to a multi-bit protection code erase request by the processing unit or by a program executed by the processing unit, the hardware monitor electronic circuit is configured to:
read an erase request multi-bit protection code in the stack structure at an address specified by the multi-bit protection code erase request;

compare the erase request multi-bit protection code with an expected multi-bit protection code value; and
generate the error signal when the erase request multi-bit protection code is different from the expected multi-bit protection code value.

2. The hardware monitor circuit according to claim 1, comprising:
an address memory configured within the at least one internal memory; and
a value memory configured within the at least one internal memory,
wherein the address memory is configured to store addresses of multi-bit protection codes stored in the stack structure and the value memory is configured to store multi-bit protection code values equal to the multi-bit protection codes stored in the stack structure,
wherein the gating logic is configured to output the error signal based on a comparison of a multi-bit protection code value on a data bus read via the bus interface to a value stored in the value memory.

3. The hardware monitor circuit according to claim 1, comprising:
a first register configured to be coupled to the processing unit, wherein the first register is configured to receive an insertion address, and the electronic control circuit is configured to generate a multi-bit protection code as a function of the insertion address; and
a second register configured to be coupled to the processing unit, the second register being configured to receive an address of the multi-bit protection code.

4. The hardware monitor circuit according to claim 1, comprising:
a random or pseudo-random number generator, wherein the electronic control circuit is configured to use the random or pseudo-random number generator to generate the multi-bit protection codes.

5. A microprocessor, comprising:
a processing unit;
at least one call stack structure arranged in an internal memory;
a stack pointer structure associated with the at least one call stack structure;
an address bus coupled to the processing unit;
a data bus coupled to the processing unit; and
a hardware monitor electronic circuit configured to:
generate a plurality of multi-bit protection codes and insert the plurality of multi-bit protection codes into the at least one call stack structure;
store addresses of the plurality of multi-bit protection codes inserted in the at least one call stack structure;
generate an error signal in response to an attempt to modify a first multi-bit protection code of the plurality of multi-bit protection codes present in the at least one call stack structure, the error signal arranged to force the processing unit to enter a secure mode;
monitor the address bus; and
generate the error signal in response to an address of a stored multi-bit protection code of the plurality of multi-bit protection codes appearing on the address bus, wherein in response to a multi-bit protection code erase request by the processing unit or by a program executed by the processing unit, the hardware monitor electronic circuit is configured to:
read an erase request multi-bit protection code in the at least one call stack structure at an address specified by the multi-bit protection code erase request;
compare the erase request multi-bit protection code with an expected multi-bit protection code value; and
generate the error signal when the erase request multi-bit protection code is different from the expected multi-bit protection code value.

6. A microprocessor according to claim 5 wherein the hardware monitor electronic circuit is configured to generate the error signal in response to an attempt to read a second multi-bit protection code in the at least one call stack structure.

7. A microprocessor according to claim 5 wherein the hardware monitor electronic circuit is configured to generate the plurality of multi-bit protection codes as random or pseudo-random multi-bit protection codes.

8. A microprocessor according to claim 5 wherein the hardware monitor electronic circuit is configured to generate the plurality of multi-bit protection codes as deterministic and reproducible multi-bit protection codes.

9. A microprocessor according to claim 5 wherein the hardware monitor electronic circuit comprises:
a register that is write-accessible to the processing unit, wherein the hardware monitor electronic circuit is configured to generate a register multi-bit protection code of the plurality of multi-bit protection codes and apply a value of the register multi-bit protection code of the plurality of multi-bit protection codes on the data bus in response to the processing unit executing a write operation to the register.

10. A microprocessor according to claim 9 wherein the hardware monitor electronic circuit is configured to insert the register multi-bit protection code of the plurality of multi-bit protection codes in the at least one call stack structure at an address present in the register.

11. A microprocessor according to claim 5, wherein the hardware monitor electronic circuit is configured to erase the erase request multi-bit protection code in the at least one call stack structure after having verified the erase request multi-bit protection code.

12. A microprocessor according to claim 5, wherein the hardware monitor electronic circuit comprises:
a register, the register being write-accessible to the processing unit, wherein the hardware monitor electronic circuit is configured to interpret a write of the register as a request to erase the erase request multi-bit protection code.

13. A microprocessor according to claim 12 wherein the hardware monitor electronic circuit is configured to interpret the write of the register as an erase request of the erase request multi-bit protection code at an address in the at least one call stack structure, the address in the at least one call stack structure present in the register.

14. A hardware monitor method, comprising:
initializing a stack pointer of a processing unit;
generating a plurality of multi-bit protection codes;
inserting the multi-bit protection codes in a call stack structure;
storing addresses of the inserted multi-bit protection codes in a memory coupled to the processing unit;
monitoring, with a hardware monitor electronic circuit, addresses on an address bus of the processing unit;
generating an error signal in response to an attempt to modify a multi-bit protection code present in the call stack structure based on detecting a monitored address of a stored multi-bit protection code appearing on the address bus; and in response to the error signal, placing the processing unit in a secure mode, wherein in response to a multi-bit protection code erase request by the processing unit or by a program executed by the processing unit, the hardware monitor electronic circuit:

reads an erase request multi-bit protection code in the call stack structure at an address specified by the multi-bit protection code erase request;

compares the erase request multi-bit protection code with an expected multi-bit protection code value; and in response to the erase request multi-bit protection code being different from the expected multi-bit protection code value, generates the error signal.

15. The method according to claim 14 wherein the inserting is performed with the hardware monitor electronic circuit or with the processing unit.

16. The method according to claim 14, comprising:
executing a secure error processing function in response to the error signal.

17. The method according to claim 14, comprising:
erasing multi-bit protection codes when corresponding return functions are executed, wherein the erasing includes removing stored addresses of the inserted multi-bit protection codes from the memory.

18. The method according to claim 14 wherein generating the plurality of multi-bit protection codes includes drawing random or pseudo-random numbers from an associated random or pseudo-random number generator.

* * * * *